Patented Nov. 30, 1943

2,335,454

UNITED STATES PATENT OFFICE 2,335,454

POLYMERIZATION OF N-VINYL LACTAMS

Curt Schuster, Rudolf Sauerbier, and Hans Fikentscher, Ludwigshafen-on-the-Rhine, Germany; vested in the Alien Property Custodian No Drawing. Application August 10, 1940, Serial No. 352,114. In Germany August 1, 1939

10 Claims. (Cl. 260—84)

The present invention relates to a process for the manufacture of polymerization products.

We have found that valuable polymerization products are obtained by polymerizing N-vinyl lactams, either alone or in admixture with other polymerizable compounds containing one or more omega-methylene groups in the presence of oxygen or substances supplying oxygen.

Suitable N-vinyl lactams are, for example, N-vinyl-alpha-pyrrolidone, N-vinyl-alpha-piperidone, N-vinyl-hexahydrophthalimidine and N-vinyl-caprolactam.

Among compounds containing an omega-methylene group and which are suitable for being interpolymerized with N-vinyl lactams there may be mentioned for example acrylic acid and its derivatives and homologues, such as acrylic esters, acrylic nitrile and methacrylic esters, unsaturated ketones, such as vinyl methyl ketone and vinyl chloride.

Among substances supplying oxygen there may be mentioned inorganic and organic peroxides such as hydrogen peroxide, persulphates, peracetic acid and the like. The polymerization may be carried out in a block, i. e. in a coherent mass and in the absence of a diluent or in the presence of diluents or solvents, as for example water or alcohols. It is preferable to work at a moderately elevated temperature, especially at from 40 to 150° C., in an open or closed vessel, with or without reflux cooling. By shaking or stirring the reaction may be accelerated in many cases.

The products obtained are from viscous to horny or glass-like, sometimes also brittle materials possessing a high softening point. They swell and dissolve partly in water, partly only in certain organic solvents. They form solutions of high viscosity possessing good sticking power which properties render them valuable for a variety of technical applications, as for example as sizes and adhesives, as protective colloids or emulsifying or thickening agents, as well as binders, as for example for lacquers. When used for producing interpolymerization products, the N-vinyl lactams improve the resistance of the products to solvents, especially to benzine, and raise the softening point thereof.

The following examples serve to illustrate how the present invention may be carried out in practice, but the invention is not restricted to the said examples. The parts are by weight.

Example 1

50 parts of N-vinyl-alpha-pyrrolidone and 1 part of 3 per cent. hydrogen peroxide are heated at 110° C. for 3 hours in a pressure-tight vessel, a solid colorless polymerization product being formed in a quantitative yield. In the same manner polymerization products of N-vinyl caprolactam and N-vinyl hexahydrophthalimidine can be prepared.

Example 2

50 parts of N-vinyl-alpha-pyrrolidone and 1 part of potassium persulphate (or 0.5 part of 3 per cent. hydrogen peroxide and 0.5 part of potassium persulphate) are heated under the same conditions as in Example 1, a viscous brown polymerizate being formed in a good yield.

Example 3

50 parts of N-vinyl-alpha-pyrrolidone, 1 part of water and 0.1 part of benzoyl peroxide are heated at 100° C. for 8 hours in a pressure-tight vessel, a yellow viscous polymerizate being obtained in a good yield.

Example 4

50 parts of N-vinyl-alpha-pyrrolidone and 1 part of sodium peroxide (or 0.5 part of sodium peroxide and 0.5 part of 3 per cent. hydrogen peroxide) are heated at 110° C. for 6 hours in a strong-walled vessel, an amorphous pulverulent polymerization product being obtained.

Example 5

50 parts of N-vinyl-alpha-pyrrolidone, 100 parts of ethanol, 5 parts of 3 per cent. hydrogen peroxide and 0.5 part of benzoyl peroxide are heated to boiling under reflux cooling for 5 hours. After removing the ethanol by distillation, a viscous brown polymerization product remains.

Example 6

50 parts of N-vinyl-alpha-pyrrolidone, 100 parts of ethanol, 5 parts of water and 2.5 parts of 3 per cent. hydrogen peroxide are heated under the conditions specified in Example 5. After evaporating the solvent a solid, pale yellow polymerization product is obtained in a quantitative yield.

Example 7

A mixture of 70 parts of acrylic acid (100 per cent. strength) in the form of a 73 per cent. solution, 30 parts of N-vinyl-alpha-pyrrolidone, 30 parts of sodium carbonate, 200 parts of water and 0.2 part of potassium persulphate is heated to 50 to 60° C. while stirring. Polymerization takes place with evolution of heat. It is finished after some hours. The polymerization product obtained is treated with steam and thus freed from slight residual amounts of monomers. An interpolymerization product is thus obtained in the form of a highly viscous clear solution, which is suitable as adhesive.

Example 8

A mixture of 55 parts of acrylic acid (100 per cent. strength), 45 parts of N-vinyl-alpha-pyrrolidone and 100 parts of water is heated to 85 to 90° C., whereupon 7.5 parts of 30 per cent. hydrogen peroxide are added. The whole is then stirred at between 85 and 90° C. for 3 hours, a viscous, water-clear solution of the interpolymerization product formed being obtained which by treatment with steam may be freed from any residual amounts of monomers, if desired.

Example 9

A mixture of 35 parts of acrylic acid (100 per cent. strength), 15 parts of N-vinyl-alpha-pyrrolidone, 20 parts of sodium carbonate, 50 parts of vinyl chloride, 300 parts of water and 1 part of sodium persulphate is shaked in a shaking bomb for 40 hours at 40° C. The interpolymerization product formed is precipitated by means of dilute sulphuric acid. It may be pressed into plates at high temperature. The product is soluble in benzine and benzene, while it swells in acetone.

What we claim is:

1. A process of producing polymerization products which comprises heating an N-vinyl lactam with a polymerization catalyst capable of supplying oxygen under the reaction conditions and selected from the class consisting of inorganic peroxides and organic peroxides.

2. A process of producing polymerization products which comprises heating at a temperature between 40 and 150° C., an N-vinyl lactam with a polymerization catalyst capable of supplying oxygen under the reaction conditions and selected from the class consisting of inorganic peroxides and organic peroxides.

3. A process of producing polymerization products which comprises heating a mixture of an N-vinyl lactam and another polymerizable compound containing at least 1 omega methylene group connected with a carbon atom by a double bond and selected from the class consisting of acrylic acid, acrylic nitrile, vinyl methyl ketone and vinyl chloride, with a polymerization catalyst capable of supplying oxygen under the reaction conditions and selected from the class consisting of inorganic peroxides and organic peroxides.

4. A process of producing polymerization products which comprises heating an N-vinyl α-pyrrolidone with a polymerization catalyst capable of supplying oxygen under the reaction conditions and selected from the class consisting of inorganic peroxides and organic peroxides.

5. A process of producing polymerization products which comprises heating a mixture of an N-vinyl-α-pyrrolidone and acrylic acid with a polymerization catalyst capable of supplying oxygen under the reaction conditions and selected from the class consisting of inorganic peroxides and organic peroxides.

6. Products obtained by simultaneously copolymerizing an N-vinyl lactam and another polymerizable compound containing at least 1 omega methylene group connected with a carbon atom by a double bond and selected from the class consisting of acrylic acid, acrylic nitrile, vinyl methyl ketone and vinyl chloride.

7. Products obtained by copolymerizing N-vinyl α-pyrrolidone and acrylic acid.

8. A process of producing polymerization products which comprises heating an N-vinyl caprolactam with a polymerization catalyst capable of supplying oxygen under the reaction conditions and selected from the class consisting of inorganic peroxides and organic peroxides.

9. A process of producing polymerization products which comprises heating an N-vinyl hexahydrophthalimidine with a polymerization catalyst capable of supplying oxygen under the reaction conditions and selected from the class consisting of inorganic peroxides and organic peroxides.

10. Products obtained by copolymerizing N-vinyl α-pyrrolidone, acrylic acid and vinyl chloride.

CURT SCHUSTER.
RUDOLF SAUERBIER.
HANS FIKENTSCHER.